Oct. 27, 1953
A. W. SCRUGGS
2,656,604
MACHINE FOR REPRODUCING PATTERNS OR IMAGES
Filed Aug. 20, 1949
6 Sheets-Sheet 1
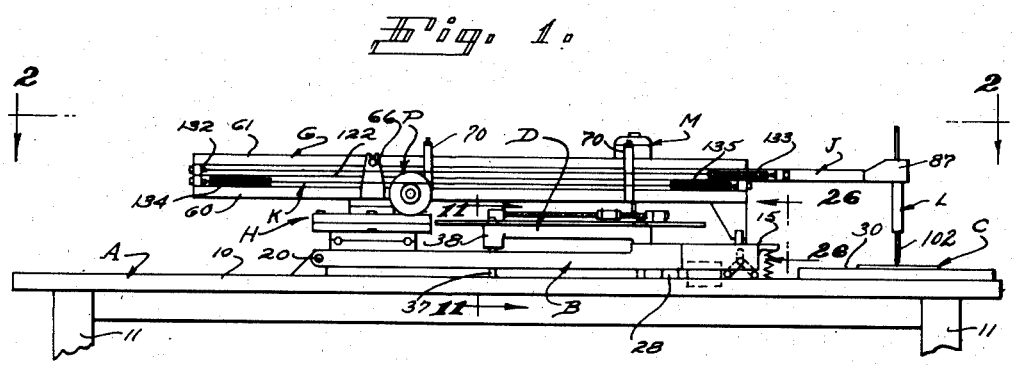
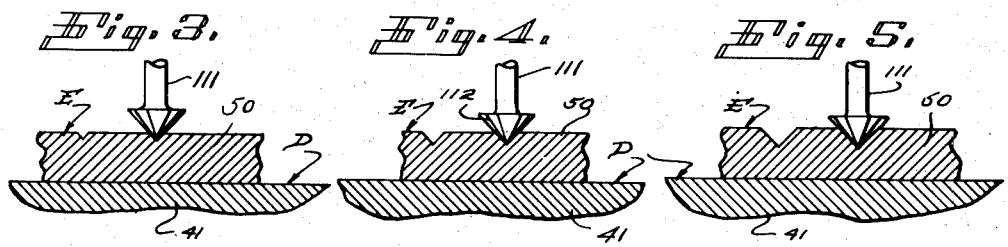
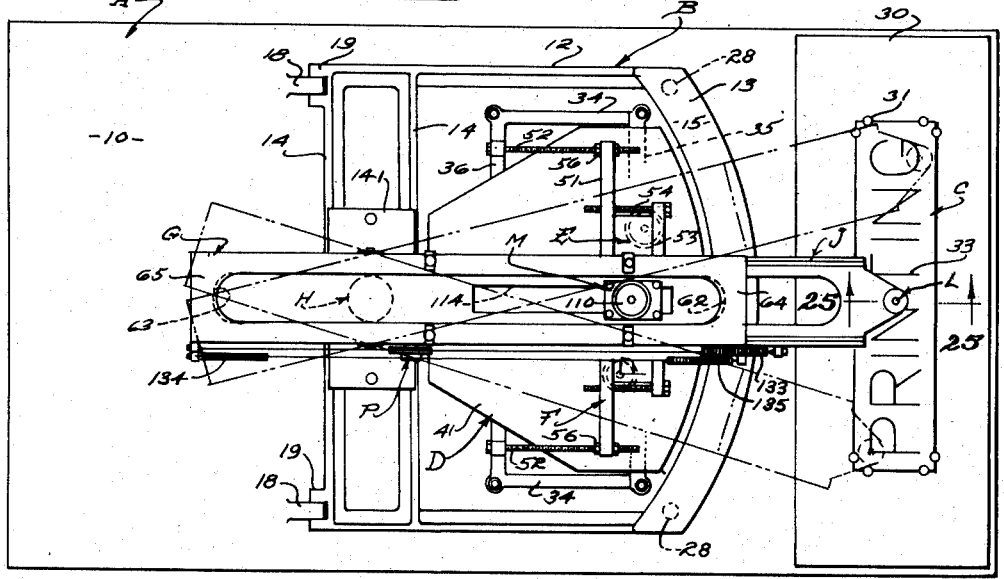
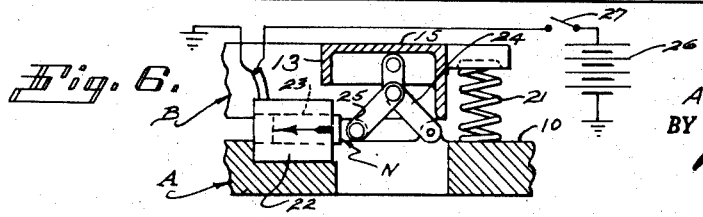
INVENTOR.
Arthur W. Scruggs
BY
Attorney Oct. 27, 1953      A. W. SCRUGGS      2,656,604
MACHINE FOR REPRODUCING PATTERNS OR IMAGES
Filed Aug. 20, 1949      6 Sheets-Sheet 2
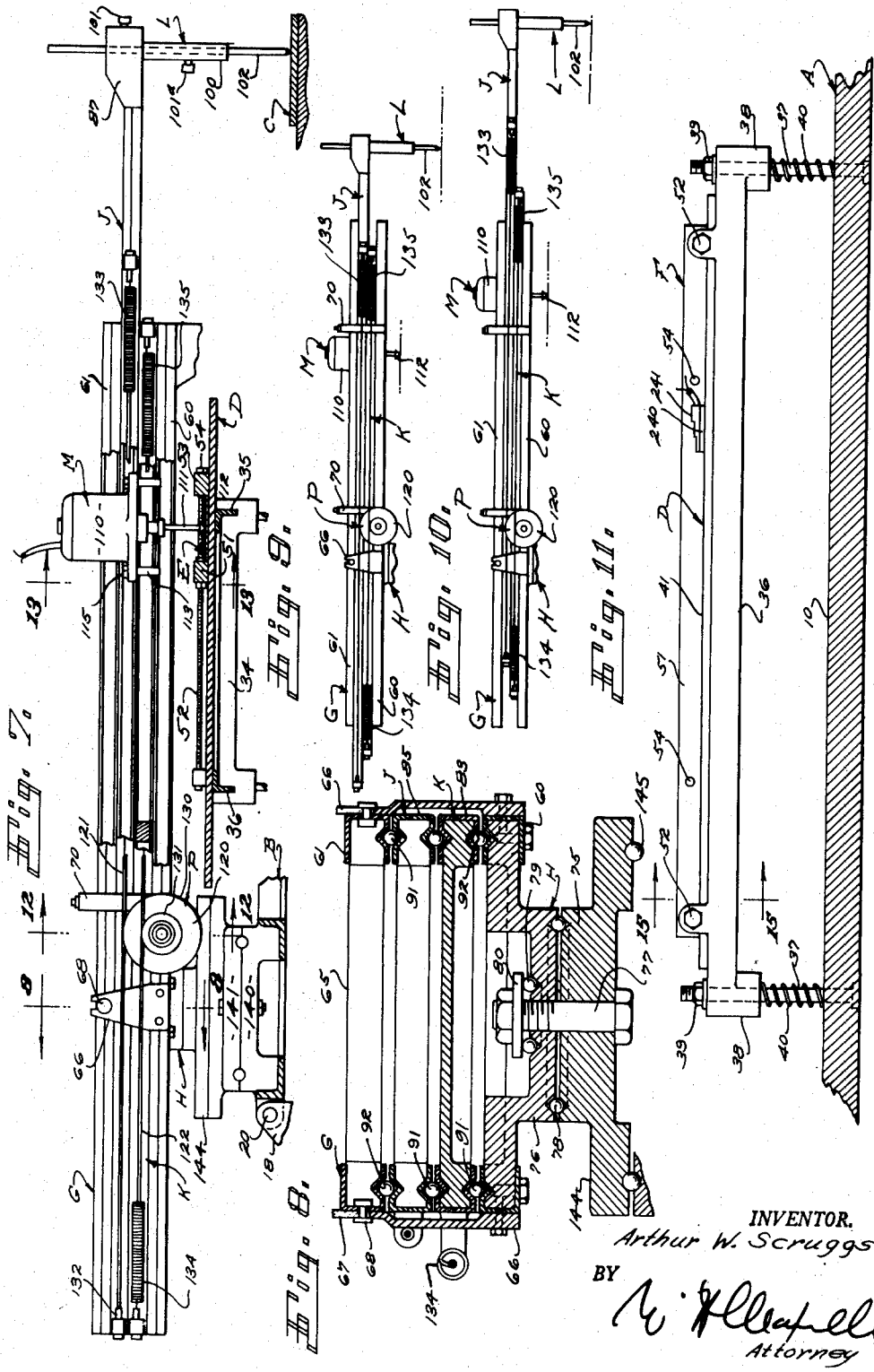
INVENTOR.
Arthur W. Scruggs
BY
Attorney Oct. 27, 1953  A. W. SCRUGGS  2,656,604
MACHINE FOR REPRODUCING PATTERNS OR IMAGES
Filed Aug. 20, 1949  6 Sheets-Sheet 3
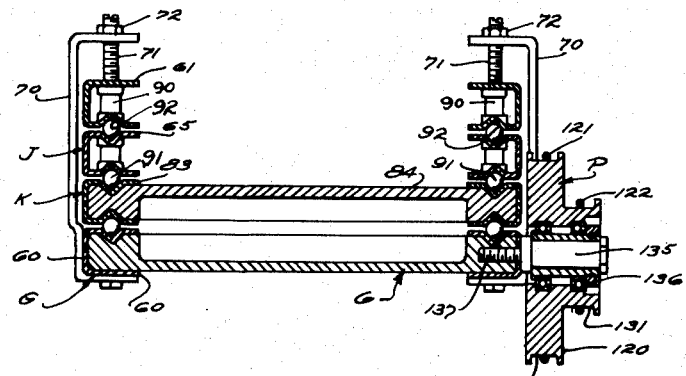
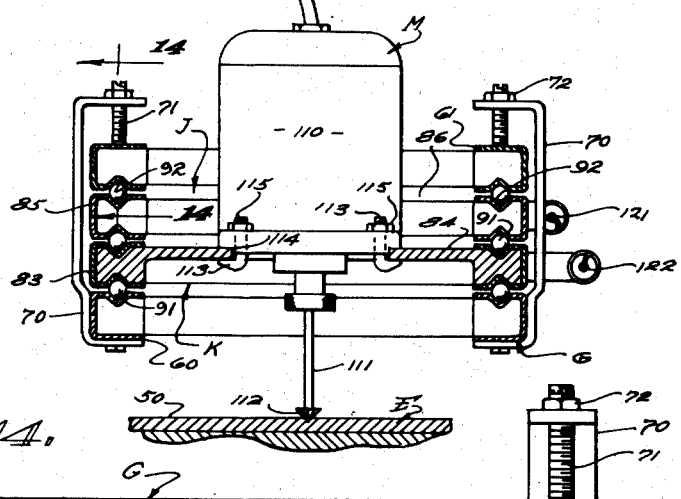
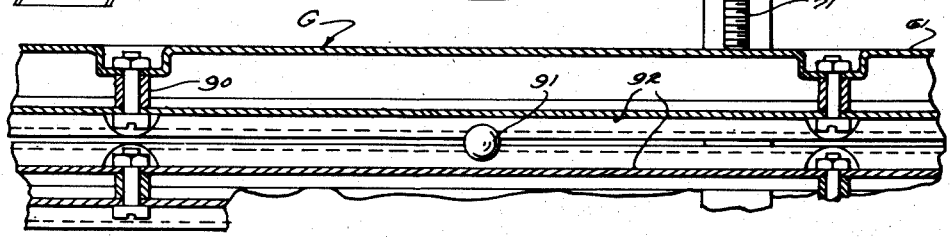
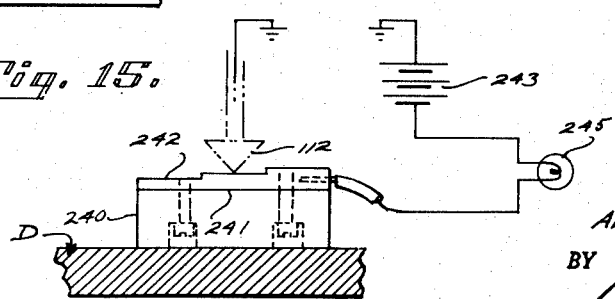
INVENTOR.
Arthur W. Scruggs
BY
Attorney Oct. 27, 1953  A. W. SCRUGGS  2,656,604
MACHINE FOR REPRODUCING PATTERNS OR IMAGES
Filed Aug. 20, 1949  6 Sheets-Sheet 4
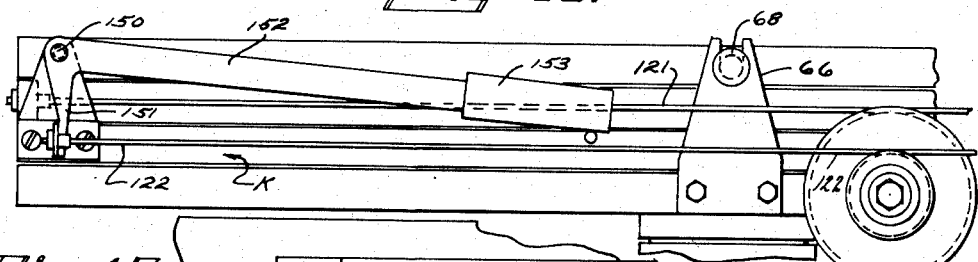
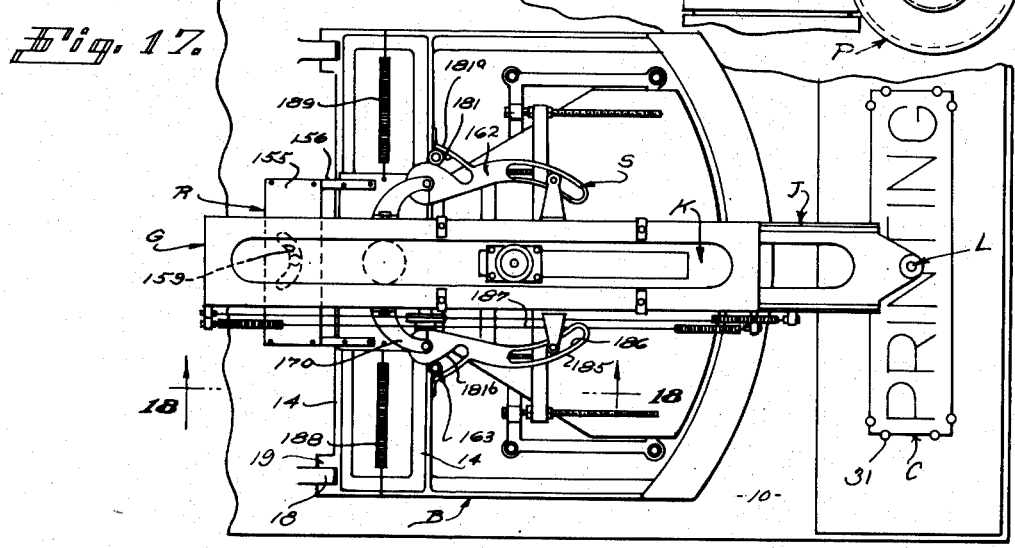
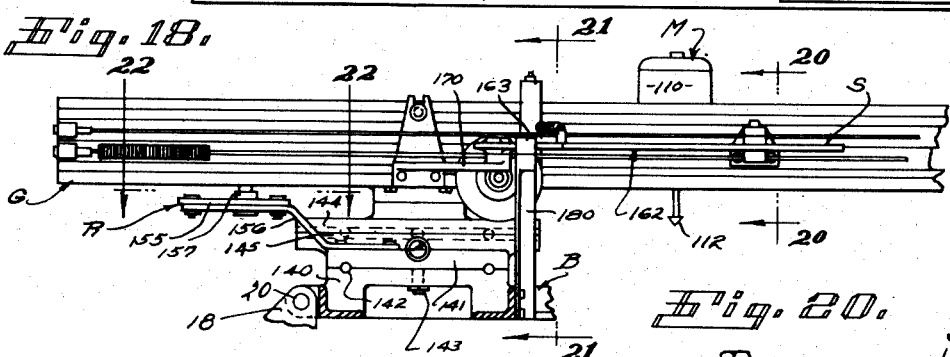
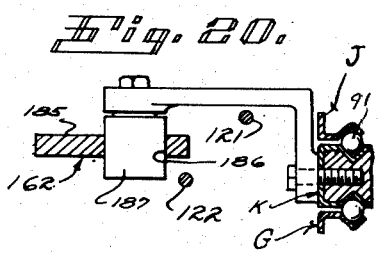
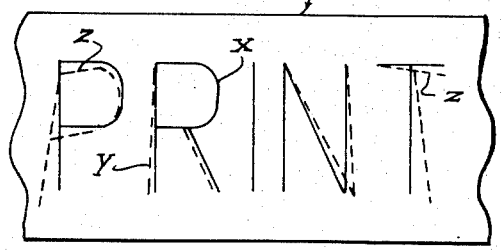
INVENTOR.
Arthur W. Scruggs
BY
Attorney Oct. 27, 1953      A. W. SCRUGGS      2,656,604
MACHINE FOR REPRODUCING PATTERNS OR IMAGES
Filed Aug. 20, 1949      6 Sheets-Sheet 5
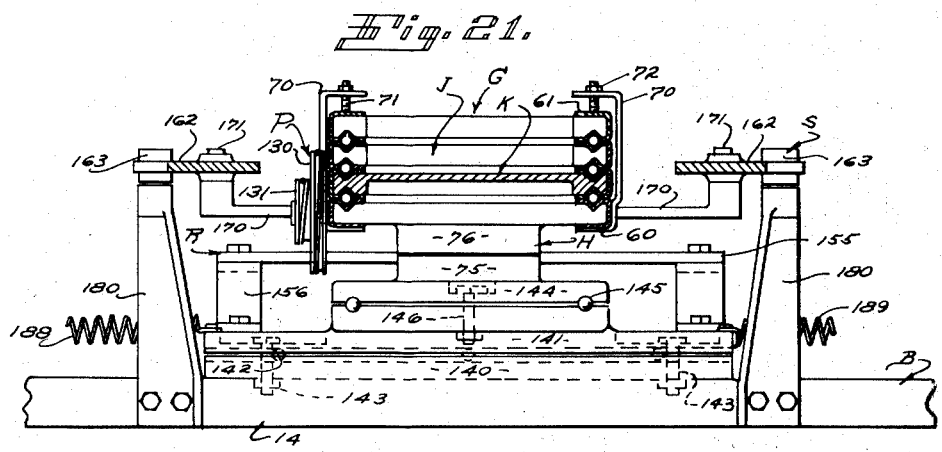
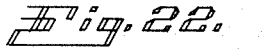 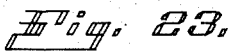 
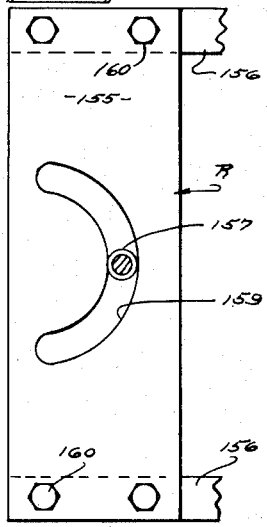 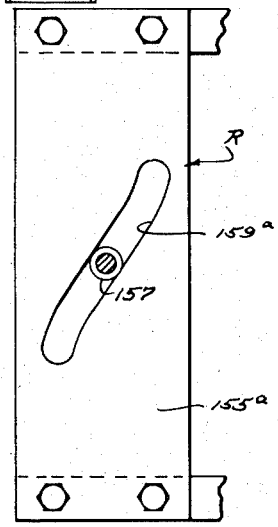 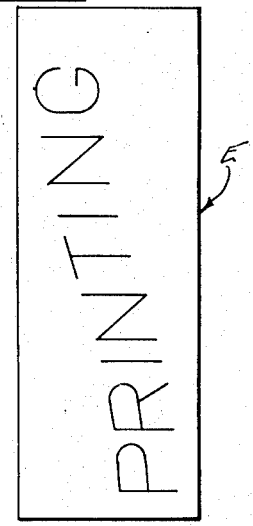
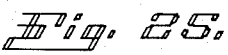 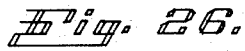
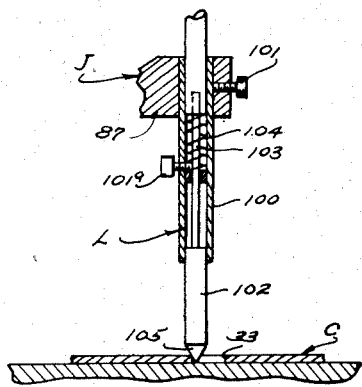
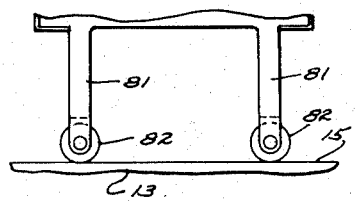
INVENTOR.
Arthur W. Scruggs
BY
Attorney Oct. 27, 1953  A. W. SCRUGGS  2,656,604
MACHINE FOR REPRODUCING PATTERNS OR IMAGES
Filed Aug. 20, 1949  6 Sheets-Sheet 6
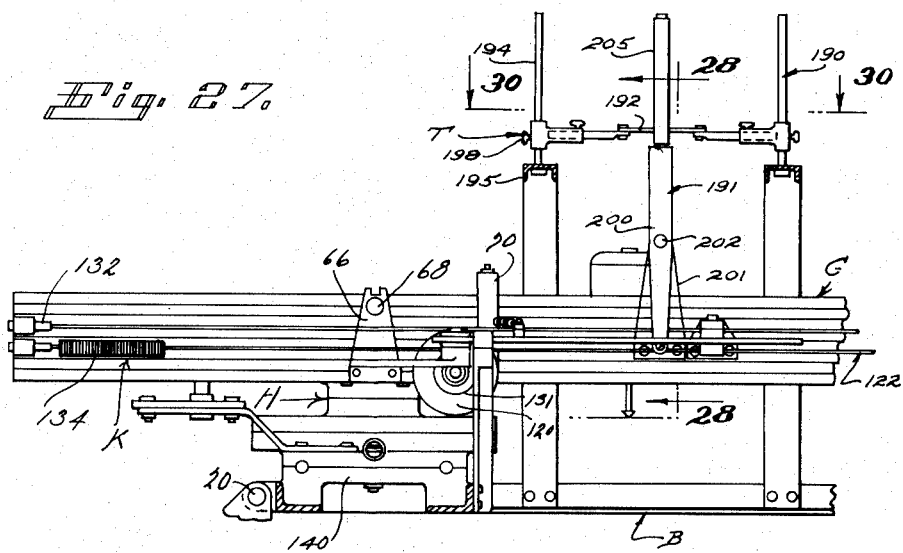
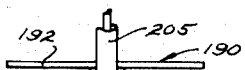
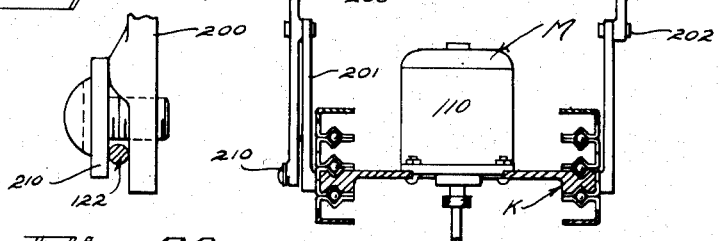
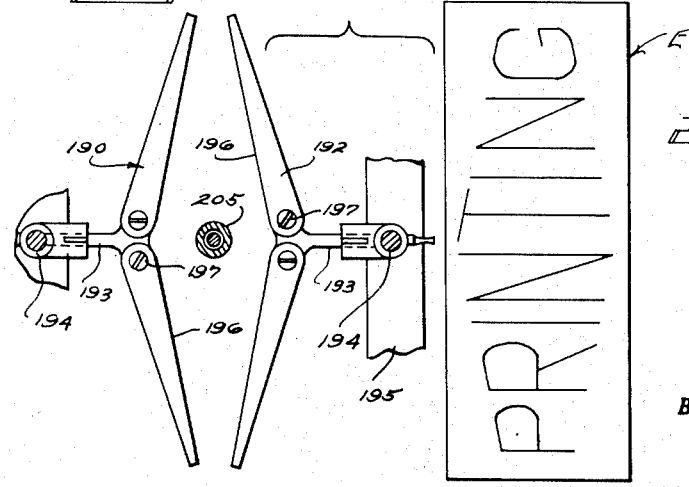
INVENTOR.
Arthur W. Scruggs
BY
Attorney Patented Oct. 27, 1953

2,656,604

UNITED STATES PATENT OFFICE 2,656,604

MACHINE FOR REPRODUCING PATTERNS OR IMAGES

Arthur W. Scruggs, Bloomington, Calif.

Application August 20, 1949, Serial No. 111,368

28 Claims. (Cl. 33—23)

1

This invention relates to a machine for reproducing patterns or images and it is a general object of the invention to provide a machine which serves to reproduce objects or images in a varied or modified form as, for instance, on a different scale, in a modified shape, or both.

The machine of the present invention is characterized by a table which carries a templet with an image or markings thereon. A work carrying platform is adjustably supported on the table and a frame-like base is pivoted on the table to surround the platform.

An elongate frame is pivoted to the base on an axis normal to the plane of the base and is stopped in a predetermined position relative to the table, there being means normally holding the base extended and means operating to move the base to the stopped position.

Two parallel relatively movable slides are carried by the frame to operate longitudinally thereof. One of the slides is a driver and projects from the frame to carry a stylus for cooperation with the templet while the other slide is a carrier which adjustably supports a motor driven implement or tool. A differential drive is provided between the drive slide and the carrier slide so that as the drive slide is operated in the course of tracing or following markings on the templet, the tool moves in a predetermined manner to gain a desired reproduction of the markings. The machine further embodies correcting means acting to correct action which may be considered distortion or to introduce modifications in the action of the machine to gain desired variations between the markings on the templet and those gained on the work. Further, the machine involves modifying means acting to effect deliberate variation or modification in a predetermined manner, which may be distinguished from distortions.

A general object of the present invention is to provide a machine of the general character referred to which involves few simple accurately operating parts essential to the basic action desired.

Another object of the invention is to provide a machine of the character referred to which is capable of convenient, rapid, modification so that its action may be varied in such manner as to gain a wide range or variety of reproductions.

A further object of the invention is to provide a machine of the general character referred to in which the various working parts are of simple,

2 inexpensive construction, are readily accessible for adjustment, replacement or repair, and are effective and accurate in operation.

The various objects and features of my invention will be fully understood from the following detailed description of typical preferred forms and applications of my invention, throughout which description reference is made to the accompanying drawings, in which:

Fig. 1 is a side elevation of a machine embodying the present invention, showing it in operating condition. Fig. 2 is a plan view of the machine shown in Fig. 1, being a view taken as indicated by line 2—2 on Fig. 1. Figs. 3, 4 and 5 are views showing various positions of the work holding platform relative to the tool of the machine. Fig. 6 is an enlarged detailed sectional view showing the means normally holding the base of the machine elevated and the means which acts to hold the base of the machine in operating position. Fig. 7 is an enlarged longitudinal side elevation of the machine, as shown in Fig. 1, with parts thereof broken away to show details of construction. Fig. 8 is an enlarged transverse sectional view taken as indicated by line 8—8 on Fig. 7. Figs. 9 and 10 are views similar to a portion of Fig. 1 showing the machine in two extreme positions and indicating the range of movement of the stylus which is provided to follow a templet or the like, and the range of movement of the tool which acts on the work. Fig. 11 is an enlarged detailed sectional view of a portion of the machine showing the work carrying platform and being a view taken as indicated by line 11—11 on Fig. 1. Fig. 12 is an enlarged detailed transverse sectional view taken as indicated by line 12—12 on Fig. 7. Fig. 13 is an enlarged detail sectional view taken as indicated by line 13—13 on Fig. 7. Fig. 14 is an enlarged longitudinal sectional view of a portion of the machine being a view taken as indicated by line 14—14 on Fig. 13. Fig. 15 is a diagrammatic view illustrating parts of the gauging means provided for gauging the work carrying table relative to the tool. Fig. 16 is an enlarged side elevation of a portion of the machine showing a form of construction that can be used in coupling lines of the drive provided between the slides employed in the machine. Fig. 17 is a plan view similar to Fig. 2 showing the machine equipped with elements not present in Fig. 2. Fig. 18 is a side elevation of parts shown in Fig. 17, being a view taken as indicated by line 18—18 on Fig. 17. Fig. 19 is a diagrammatic view illustrating reproductions or modified reproductions such as may be made by the machine. Fig. 20 is an enlarged detailed sectional view of a portion of the machine taken as indicated by line 20—20 on Fig. 18. Fig. 21 is an enlarged detailed transverse sectional view taken as indicated by line 21—21 on Fig. 18. Fig. 22 is an enlarged section taken as indicated by line 22—22 on Fig. 18. Fig. 23 is a view similar to Fig. 22 showing a part of somewhat different form. Fig. 24 is a view similar to Fig. 19 indicating the character of results gained by the use of a part such as is shown in Fig. 23. Fig. 25 is an enlarged detailed sectional view of a stylus that may be used in the machine, being a view taken as indicated by line 25—25 on Fig. 2. Fig. 26 is an enlarged detailed view taken as indicated by line 26—26 on Fig. 1. Fig. 27 is a view similar to Fig. 18 showing the machine equipped with parts in addition to those shown in Fig. 18. Fig. 28 is a transverse sectional view taken as indicated by line 28—28 on Fig. 27. Fig. 29 is an enlarged detailed sectional view of a fastening means employed in the form of the invention shown in Figs. 27 and 28. Fig. 30 is a plan section taken substantially as indicated by line 30—30 on Fig. 27. Fig. 31 is a view similar to Figs. 19 and 24, indicating the character of reproduction to be gained by use of the mechanism as shown in Figs. 27 to 30, inclusive.

In the form of the invention illustrated in Figs. 1 to 15, inclusive, the construction is such as to effect a true reproduction of a templet, or the like, on a predetermined scale such as a reduced scale relative to the templet. In this form of the invention the mechanism may be set so that the reproduction is an accurate scaled replica of the templet, as for instance, a reproduction of the templet in which the parts in the reproduction occur in the same shape as in the templet, and adjustment is provided whereby variation or distortion may be gained in the reproduction so that the reproduction has the same figures or objects as the templet but these elements are in distorted or varied forms.

The embodiments of the present invention as shown in the drawings include, generally, a table or like support A, a frame-like base B mounted on the table to be shiftable relative thereto, a templet C carried on table, a platform D carried by the table, work E carried by the platform through a suitable work mounting F, a working frame G, means H adjustably pivotally mounting the frame G on the base B, slides carried by the frame G, one a driver J and the other a carrier K, a differential drive P between the slides, a stylus L carried by the driver slide J to cooperatively engage the templet C, a power driven implement M carried by the carrier K and operating on the work E, and various other elements and features of construction all of which will be described.

The table A may, in practice, be of any suitable form and construction and in the case illustrated it is a typical or simple table having a flat top 10 and suitable legs or supports 11.

The base B is preferably a frame-like rigid unit or element with spaced sides 12 extending longitudinally of the structure, a front end 13 extending between the forward ends of the sides and rear end members 14 extending between the rear end portions of the sides. The rear members 14 of the base are spaced and parallel forming a guide extending transversely of the machine and carrying the means H by which the working frame is supported on the base.

The front 13 of the base is curved or arcuate in form and has a flat top 15 forming a track on which the forward end portion of the working frame is supported through anti-friction means as will be hereinafter described.

The base B is shiftable relative to the top of the table A to vary the motor driven implement M relative to the work and also the stylus L relative to the templet. In the form of the invention illustrated the base B is pivotally connected to the table A on an axis extending transversely of the mechanism and located immediately above the top 10 of the table. In the case illustrated lugs 18 are shown projecting upwardly from the top of the table and engaged by the lugs 19 at the rear of the base. Pivot pins 20 connect the lugs 18 and 19. One or more springs 21 preferably located at the forward portion of the base act to normally yieldingly hold the base in an up or elevated position. In the arrangement illustrated the springs are located between the top 10 of the table and the forward end portion of the base, as shown in Fig. 6 of the drawings.

A means N is provided to operate or depress the forward end portion of the base B against the resistance of the springs 21. In the case illustrated the means N is an electromagnetic means and includes a coil 22 carried by the table, a core 23 operating in the coil and links coupling the core, the base and the table. In the particular case illustrated a link 24 is connected to the table and to the base, while a link 25 is connected with the base and to the core 23. When the coil 22 is energized the core 23 moves in the direction indicated by the arrow in Fig. 6 causing the forward end portion of the base D to be moved downwardly against the action of the springs 21. In practice sufficient play or looseness is provided in the linkage just described to allow the desired action to occur. A control circuit is provided for the coil 21 which circuit may be energized from a suitable source of energy 26 and may be under control of a switch 27. Stop lugs 28 may be provided on the table top 10 to limit downward movement of the base B.

The templet C may be any suitable object or element which is to be reproduced or which bears characteristics or markings which are to be reproduced. In the drawings it is shown as a sheet of material secured to a block 30 by suitable fasteners 31 and the features to be reproduced are markings 33 on the sheet, which markings are in the form of letters. If desired the markings or features of the templet may be recesses or cuts occurring in the sheet which forms the templet as shown in Fig. 25 of the drawings. In practice the recesses or cuts may vary in depth thereby controlling the depth of cut made by implement M.

The platform D provided by the present invention is mounted on the table A to occur within and to project upwardly through the frame-like base B and in the form illustrated it is in the nature of a rectangular frame having side members 34, a front transverse member 35 and a rear transverse member 36. The platform is preferably provided with a flat work carrying plate 41 which is carried on and which overlies the frame of the platform.

In accordance with the present invention the platform is supported from the table A so that it is vertically shiftable or adjustable and through shifting or adjustment of the platform the depth of cut made in the work by the implement M may be varied or controlled.

In the form of the invention illustrated the desired mounting of the platform D involves a plurality of vertical studs 37 projecting upwardly from the table A through guides 38 that occur at the corners of the platform. Adjusting stop nuts 39 are threaded on the upper end portions of the studs and compression springs 40 occur on the studs between the table and the bottom of the guides 39. The springs 40 yieldingly urge the platform inwardly, holding it against the stop nuts 39.

The work E to be acted upon by the power driven implement M is shown as a plate or block 50 resting on the top of plate 41 and the mounting means F for the work is shown as a clamp means which holds the work fixed on the plate 41. The particular clamp means illustrated in the drawings involves a main jaw 51 supported from the frame of the platform by screws 52 and a clamp jaw 53 supported from the main jaw by screws 54. The main jaw 51 is adjustable, generally, at the top of the plate 41 by varying the positions of nuts 56 which are carried on the screws 52 and which hold the jaw 51 in place on the screws. The clamp jaw 53 is adjustable or operable relative to the main jaw 51 by operation of the screws 54. By locating the work between the jaws 51 and 53 and by tightening the screws 54 the work is effectively held or clamped in position on the platform.

The working frame G is an elongate structure which normally extends in a direction generally lengthwise of the machine and in its preferred form it is characterized by a plurality of pairs of rails which are parallel with each other. In the case illustrated there are two pairs of rails, a lower pair of load-bearing rails 60 and an upper pair of guide or retaining rails 61. The lower load bearing rails form a lower track while the upper rails form a guide track. In the case of the lower rails forming the load-bearing track the rails 60 extend parallel with each other and are joined at their forward ends by a transverse connecting member or tie 62 and at their rear ends by a transverse connecting member 63. The upper rails forming the retaining track are connected together at their forward ends by a transverse tie member 64 and at their rear ends by a transverse tie member 65.

In the preferred form of the invention the retaining track formed by the rails 61 is shiftable or adjustable relative to the load bearing track formed by the rails 60. In the form of the invention illustrated vertical guide brackets 66 are carried by the rails 60 and extend upwardly therefrom at the sides of the working frame. Vertical slots or guideways 67 in the brackets 66 slidably carry pins 68 which project from the sides of the rails 61.

In the preferred form of the invention a pressure means is provided for holding the retainer track down and in the desired position relative to the load bearing track. In the case illustrated brackets 70 are carried by the lower rails 60 and project upwardly therefrom at the sides of the working frame. Adjusting screws 71 are carried by the brackets 70 and bear down on the rails 61, as illustrated in Figs. 12 and 13 of the drawings. Lock nuts 72 on the screws 71 set them in the desired adjusted positions.

The mounting H is provided to adjustably and pivotally support the working frame G on the base B. In the case illustrated the means H involves, generally, a table 75 carried in fixed position at the rear end portion of the base B, a center plate 76 carrying the working frame and resting on the table and a centering pin 77 coupling the table 75 and plate 76. The pin 77 is located so that its axis is in the middle of the tracks of the frame and extends normal to the tracks to be substantially vertical, as shown throughout the drawings.

In the preferred form of the invention anti-friction bearing means are incorporated in the structure just described, for instance, anti-friction balls 78 are provided between the table 75 and plate 76 while anti-friction balls 79 are provided between the head 80 on the pin 77 and the plate 76. The plate is shown secured to and between the lower rails 60 of the working frame. Supporting means for the forward end portion of the working frame supports the working frame from the forward end portion of the base B. In the preferred form of the invention legs 81 depend from the working frame and carry rollers 82 which operate on the top 15 of the forward member of the base.

So far as the form of the invention being described is concerned the means H mounting the frame on the base may be any suitable construction providing the pivotal axis for the frame normal to the plane of the base. In the case illustrated the construction is such as to provide for operation or operations essential in the modified form of the invention hereinafter described. This construction involves, generally, mounting of the table of the means H on the rear members of the base for movement lengthwise of the rear frame members 14 and also transversely thereof. Longitudinal guides 140 are shown provided on the base members 14 and a head 141 is mounted on the guides through anti-friction bearing means 142 so that the head moves longitudinally of the guides 140 and therefore transversely of the machine.

A suitable coupling or tie 143 connects the head 141 and guides 140. The couplings 143 are carried by the guides 140 and extend through a slot or guideway in the head 141 which guideway extends parallel with the guides 140. The couplings are such that they can be tightened in order to set the head against movement on the guide members 140 and when operating the structure as above described the couplings 143 will be thus set.

A flange-like enlargement 144 is provided on the turntable and is supported on the head through anti-friction means 145 so that the flange 144 can move relative to the head 141 in a direction lengthwise of the machine. Ties or couplings 146 connect the flange 144 with the head 141 and in the case illustrated they are carried by the head and operate a guide slot in the flange 144. The couplings 146, like the couplings 143, may be set to hold the flange 144 against movement relative to the head and they will be so set during normal operation of the mechanism above described.

The slides J and K are shown as being of substantially the same width and are carried by and between the rails or tracks of the frame G. In the preferred arrangement the slide J is a driver or driving element and is located above the slide K which serves as a carrier for the implement M.

The carrier slide has parallel runners 83 supported on the lower rails 60, and a cross member 84 extends between the runners holding them in the desired spaced relation.

The driving slide J preferably includes runners 85 which rest on the runners 83 of slide K and cross members 86 tie the runners 85 together and brace them apart in the desired manner. The slide J is somewhat longer than slide K and has a forwardly projecting head 87 which carries the stylus L.

In the preferred construction the runners of the slides are formed of upper and lower sections joined by couplings 90 and anti-friction bearing means are provided between the slides and the rails of the working frame. In the preferred form of the invention the bearing means involves anti-friction balls 91 carried in registering grooves or raceways 92 provided in opposing parts of the slides and between the parts of the slides which oppose the rails of the frame. In practice it is desirable that the ends or heads of the couplers 90 project in such manner as to engage the balls 91 and separate them into groups in order to keep them distributed lengthwise of the structure.

The stylus L carried by the head 87 will, in practice, vary in size and form and construction, depending upon the service being performed by the machine. In the particular case illustrated a typical stylus is shown. The stylus illustrated in Fig. 25 of the drawings involves a vertical guide 100 adjustable vertically in the head J and set in position by a set screw 101. A pointed follower 102 is slidably carried by the guide 100 and is set in position by a set screw 101ª. A stem 103 projects upwardly from the follower 102 and a spring 104 acts through the stem to normally yieldingly hold the follower in an up position. As the apparatus is operated the follower 102 is moved down against the resistance of the spring to bring its tip or pointed end 105 into cooperative engagement with the templet C.

In practice, the means M may be or may include any suitable marker or marking device and may vary widely depending upon the action or service to be performed. In the particular case illustrated a power driven implement M is shown which involves a prime mover or motor 110 carried by the part 84 that extends between and connects the runners 83 of the slide K. The motor 110 is arranged with its axis normal to the working frame and a depending spindle 111 carries a cutter or tool 112 which engages and operates upon the work E. When I use the term "tool" I mean to include any suitable type or form of cutter and also any marker, scratcher, etc., that will serve in the machine to give the desired results. In the particular form of the invention shown the motor 100 is secured to the cross member 84 by hook-like fasteners 113. In the preferred form of the invention the member 84 that extends between or which connects the runners of slide K extends a substantial distance lengthwise of slide K and has a longitudinal guideway or opening 114 therein. The motor 110 is adjustable lengthwise of the guideway 114 and the hook fasteners 113 depend into or through the guideway in holding the motor in the desired position on the member 84. The fasteners 113 are set or operated by nuts 115 which enable the structure just described to be adjusted lengthwise of the slide K.

The driver P provided by the slides J and K is a differential drive by which the carrier slide is operated from the driver slide and the driver means P is such that differential movement occurs between the driver and carrier. In the form of the invention illustrated a predetermined relationship or differential action occurs between the slides, for example, as the mechanism operates movement of the carrier slide is one half that of the driver slide. In the preferred form of the invention the drive connection or drive means P involves, generally, a differential pulley 120 rotatably mounted on the working frame G, a drive line 121 operated by the slide J and driving the pulley, and a driven line 122 operated by the pulley and driving the slide K.

The differential pulley 120 is mounted on an axis transverse of the working frame G, preferably near the middle portion thereof, and the pulley is preferably on an axis which is horizontally disposed. In practice variation in action gained by the mechanism may be attained by employing different differential pulleys 120 and it is therefore preferred that the differential pulley be mounted so that it is readily detachable and is subject to being conveniently replaced by a pulley of another or different size. It is to be understood, however, that when no differential action is desired, a pulley may be employed which has no differential action.

The particular differential pulley 120 illustrated in the drawings involves two drum portions arranged side by side, one a large drum 130 and the other a small drum 131. In the case illustrated where the slide K is to operate at half the speed of the slide J the large drum 130 is twice the size of the small drum 131. A mounting spindle 135 supports the pulley through anti-friction bearings 136 and is provided with a threaded extension 137 by which it is detachably secured to one side of the working frame, for instance, to the outer side of one of the lower rails 60, as shown in Fig. 12 of the drawings.

The drive line 121 is attached to the end portion of the drive slide J and in extending between the end portions of slide J the drive line is passed around the large drum of the differential pulley. In the preferred arrangement at least one end of the drive line is yieldingly attached to the drive slide. In the preferred arrangement the drive line is fixed to the rear end portion of slide J as at 132 while the forward end of the drive line is yieldingly attached to the forward end portion of slide J through a helical tension spring 133. By providing the spring 133 the drive line is maintained under a predetermined tension and slack is eliminated that might otherwise introduce error into the operation of the mechanism.

The drive line 122 is attached to and extends between the ends of the slide K and in extending between the ends of slide K it passes around the small drum of the differential pulley. In the preferred form of the invention both ends of the driven line are yieldingly coupled to the driven slide K. In the drawings helical tension springs 134 and 135 connect the driven line to the rear and forward end portions, respectively, of slide K. Through the construction just described it will be apparent how movement of the slide J lengthwise of the working frame G results in operation of the drive line so that the differential pulley is turned and as the differential pulley turns the driven line is operated causing the slide K to be moved or operated parallel with the slide J but at a different speed or to a different extent, which difference or differential action depends upon the relationship of the drums provided in the differential pulley.

In Fig. 16 of the drawings a modified construction is illustrated by which a line of the drive between the slides may be maintained under tension. In this case the modified construction is shown applied to the driven line only, whereas it may of course be applied to both lines as circumstances may require. In this particular form of construction springs such as the springs above described, as applied to the lines of the drive, are elminated. A bell crank is pivoted on the slide K through a suitable bracket and a pivot pin 150 and has an arm 151 which depends and carries the end of the driven line 122. A second arm 152 of the bell crank extends horizontally or in a substantially horizontal direction and carries a weight 153 which normally tends to swing it downwardly, with the result that the arm 151 is normally urged in a direction to maintain the line 122 tight.

In the preferred form of the invention a gauge means is provided to enable the machine to be quickly and conveniently set with the cutting head 112 of the implement M in the desired relationship to the work E when the base B has been actuated into engagement with the stops 20 to be in a down and predetermined position relative to the table A. The gauging means illustrated in Fig. 15 includes a gauge block 240 of insulating material or the like than can be placed on and moved to various positions on the top of plate 41 of the platform D. The block 240 carries a contact plate 241 having a plurality of steps 242 and the plate 240 is connected in a circuit energized from a suitable source of energy such as a battery 243. One side of the circuit energized by the battery 243 is grounded into cutting head 112 of implement M. The contact 241 is in an insulated portion of the circuit and is in series with an indicator such as a lamp 245. When the block 240 is placed on plate 41 the platform can be adjusted until the working or cutting head 112 engages the desired step 242 of contact 241, at which time the circuit is closed and the indicating lamp 245 is energized. Through the means just described the platform D can be readily adjusted and leveled.

Through the use of the gauging means just described the work carrying platform can be readily and accurately adjusted to various positions relative to the cutter 112 which acts on the work E with the result that a typical tool or cutter such as is shown in Figs. 3 to 5 of the drawings may be engaged with the work to make various cuts therein, ranging from a narrow, shallow cut, such as is shown in Fig. 3, to a wide, deep cut such as is shown in Fig. 5.

With the platform D carrying the work E adjusted and leveled in the desired manner, and with the screws 71 adjusted to hold the slides and working frame assembled in the desired manner, the machine is ready for operation. The stylus L may be moved relative to the templet C to trace or follow markings or subjects on the templet, and as this is done the working frame swings about the pivotal axis of the mounting means H between positions such as are indicated in dotted lines in Fig. 2 of the drawings. As the working frame is thus swung or pivoted the slides carried by the working frame are carried with the working frame and as the slide J is moved back and forth, or in and out tracing a subject on the templet, the slide K carrying the implement M is likewise operated back and forth or in and out. Assuming that the differential pulley has a large drum twice the size of the small drum and assuming the implement M to be adjusted to a position where it is midway between the stylus and the axis of the pivotal mounting H, the machine will operate to reproduce the object or subject of the templet accurately and so that the reproduced image is one half the size of that of the templet.

In the course of the action just described the differential pulley controls what may be termed the height of the object, as for instance, the height of letters made on the work from letters on the templet, while the position of the implement lengthwise of the slide K determines the width of such letters. If one of these factors, for instance, if the differential pulley, is set for 2 to 1, while the other factor is set for a different value, say for instance 4 to 1, then the shape of the object created on the work, for instance letters created on the work, will not be identical with that or those on the templet, but will be modified or, in effect, distorted, as shown in dotted lines in Fig. 19. Through various adjustments or through varying relationships of the parts of the machine a wide variety of variations or distortions may be gained.

When the term "templet" is used it is intended to include any object, subject, or material from which work is to be produced, and it may include written or printed matter, cuts, objects of art, and an infinite variety of such material. Further, when I refer to the machine as operating or as including a "tool" this term is to be understood as including any device, cutter, implement or object that may be used on work such as a sheet, plate, or body of material, to gain the desired action thereon or therein.

In Figs. 17 to 24, inclusive, a construction is illustrated by which distortion or modification such as that hereinabove referred to may be eliminated or corrected, or if desired certain predetermined distortions or modifications may be introduced as the mechanism operates.

In Fig. 19 of the drawings the letters in full lines X are true, or accurate, modified reproductions such as may be made by the machine hereinabove described when the machine is properly set or adjusted. When variation occurs between the adjustment of the power driven implement M and the differential drive between the slides modification or distortion may occur in two manners or directions, for example, lines such as the lines Y which if accurately reproduced would extend lengthwise of the machine, are pitched or inclined so that they diverge as shown in Fig. 19, while other lines Z which would extend straight and transverse of the machine if accurately reproduced are arcuate and are deflected, as shown by the lines Z in Fig. 19.

To modify or distort lines lengthwise of the machine either to effect a desired correction or to gain a desired modification or distortion, the pivotal axis or the working frame is shifted transversely of the machine, as for instance, longitudinally of the base members 14. To modify or distort lines transverse of the machine, either to effect a desired correction or to gain a desired modification or distortion, the pivotal axis of the working frame is shifted lengthwise of the machine. In the form of the invention shown in Figs. 17 to 24 both modifications or corrections are effected simultaneously.

To gain correction or modification of transverse lines it is advantageous to release the couplers or ties holding the flange 144 on the head 141 so that the flange 144 carrying the turntable 75 may move lengthwise of the machine. To correct the longitudinal lines the couplers 143 connecting guide members 14 and head 141 may be released allowing head 141 to shift transversely of the machine. In the form of the invention illustrated a correcting means R is provided to effect the desired transverse distortion or correction while correcting means S is provided to effect the desired longitudinal correction or distortion.

In the form illustrated the correcting means R is a cam means acting between the head 141, which is on and may be considered a part of the base, and the working frame G. The cam 155 may be a plate supported from the head 141 by brackets 156 so that it is in a plane parallel with the plane of the base and so that it underlies or is located beneath the portion of the working frame which projects rearwardly from or beyond the pivotal mounting of the working frame. The cam plate is of such extent transversely of the machine as to always occur beneath the said portion of the working frame. A depending follower 157 preferably provided with a roller engages the cam plate being preferably engaged in a cam slot or opening 159 in the cam plate. To correct a distortion such as is indicated in dotted lines in Fig. 19 to bring about transverse alignment as shown in full lines in that figure the cam slot 159 may be arcuate or curved about a center as shown in Fig. 22. When the machine is in a central or middle position as illustrated in Fig. 17, the follower 157 is in a mid-position in the cam slot 159 and as the working frame is swung in either direction from the middle position the follower operates in the cam slot to modify the position of the working frame.

It is preferred, in practice, that the cam plate 155 be releasably carried by the brackets 156, for instance, it may be attached to the brackets by screw fasteners 160 so that cam plates of various forms or having cam slots of various shapes, may be applied to the machine as circumstances require. In Fig. 23 a modified cam plate 155a is illustrated, in which case the cam slot 159a is a flattened S-shape, which is such as to create a form of image such as is shown in Fig. 24 from a straight simple line of lettering such as is shown in Fig. 2 of the drawings.

Correcting means S acts to correct or modify longitudinal distortion and it is preferably a cam means acting to shift or operate the head 141 on which the working frame is pivotally mounted transversely of the machine. In the form of the invention illustrated the cam means provided to effect transverse shifting of the pivotal axis of the working frame involves two like oppositely disposed cam mechanisms one of which operates or is active when the working frame is swung in one direction from a central position while the other operates or is active when the working frame is swung in the other direction from the central position. The cam mechanisms being alike but opposite I will describe but one of them, it being understood that such description is equally applicable to both. A cam mechanism of means S, as shown in the drawings, involves primarily a cam plate 162 mounted on or from the working frame G to operate or shift relative thereto, a follower 163 on the base B and a drive connection between the carrier slide K and the cam plate.

In the drawings the cam plate 162 is pivotally mounted on the working frame G by means of a bracket 170, the cam plate being attached to the bracket by a pivot pin 171. The pivot pin 171 carries the cam plate on an axis normal to the plane of the base B.

The follower 163 is carried by a bracket 180 projecting from the base B, for instance from a member 14 of base B, and it is preferably provided with a roller to engage the cam plate. The cam plate or surfaces of the cam plate that engage and cooperate with the follower 163 are formed by providing the cam plate with a cam opening 181. The opening 181 is preferably in the form of an open ended guideway or notch and the parts are arranged and related so that the follower stands at the entrance to the guideway or notch when the working frame is in the central position as shown in Fig. 17 and is in the extreme in or retracted position as shown in Fig. 9. In the preferred form of cam slot or notch 181 the walls or edges of the notch between which the cam follower is confined and operates are concentric with the pivotal axis of the working frame when the working frame is in a central retracted position. With such shaping of the cam notch 181 no shifting of the pivotal axis occurs as the working frame is swung about its pivotal axis while the slides are left unactuated or in the retracted position.

The drive or operating connection between the carrier slide and the cam plate 162 is shown as involving an arm 185 on the cam plate with a cam slot or opening 186 in the arm and a follower 187 which is carried by the carrier slide, engages in the cam slot 186. By suitably shaping the cam slot 186 the arm 185 is pivoted or swung about the pivot pin 171 as the carrier slide moves lengthwise of the working frame, all with the result that shifting of the carrier slide in either direction from the normal or unactuated position results in shifting of the cam 162 about the pivot pin 171. As the cam 162 turns or shifts about the pivot pin 171 it cooperates with the follower 163, causing the head 141 which carries the pivot H supporting the frame to move laterally of the machine to an extent or in a manner to effect the desired correction or distortion as the case may be. It will be apparent from examination of Fig. 17 of the drawings that a wide variation in action can be gained through the mechanism just described by variously shaping the cam openings 181 and 186.

Centering springs 188 and 189 are shown coupled to the ends of the head 141 and act to centralize the head relative to the base B. The springs are shown as tension springs anchored to base B and they act against each other and are untensioned or relaxed when the head is centered as shown in Fig. 21. When employing the springs 188 and 189, the fingers 181a formed by the guide openings 181 are not required and it is only necessary for each cam plate 162 to have a follower engaging surface 181b.

In Figs. 27 to 30, inclusive, the machine is illustrated with a modifying means acting to vary or modify the image obtainable with the structure hereinabove described, either that shown in Figs. 1 to 15 inclusive, or in Figs. 17 to 24, inclusive. The modifying means T, as shown in Figs. 27 to 30, inclusive, is not intended primarily as a means of correcting distortion or for making modifications of the character above described, but is intended to effect a modification of a pattern such as is shown in Fig. 2, so that it appears as shown in Fig. 31 or modified in other similar manners.

The modifying means T acts to vary the movement of the carrier slide K and in the form of the invention illustrated it serves to restrict the movement of the carried slide to the end that the longitudinal extent of the reproduction is modified.

In the form of the invention illustrated the normal travel of the carrier slide K, whether modified by means R or means S, or both, or whether unmodified, is restricted in part at least, and in a predetermined manner. In the case illustrated in the drawings the normal operation or movement of the carrier slide is restricted throughout a portion of its movement or operation so that as the reproduction progresses from a center point laterally to the sides, it is diminished in longitudinal extent in a manner such as is shown in Fig. 31 of the drawings.

The form of modifying means T shown in the drawings involves an adjustable stop means 190 and the carrier slide K. The adjustable stop means 190 may, in practice, vary widely in form, construction and action, as will be apparent from consideration of the drawings, and from the following description. The particular form of stop means selected for purpose of illustration involves a plurality of relatively movable parts such that they can be set or adjusted to a wide variety of positions serving to effect various restrictions of the carrier. In the drawings the stop means is shown as involving two pairs of simple stop fingers 192, each pair of fingers being carried by an adjustable arm 193, and each arm is carried by a standard 194, the standards being carried by fixed supports 195 which may straddle the forwardly projecting portion of the working frame, as shown in Fig. 27 of the drawings.

The fingers 192 are shown as simple elongate elements with plain straight working edges 196 and each finger is adjustably mounted on its supporting arm 193 by means of a vertically disposed pivot member 197 that can be set to hold the finger in a fixed position relative to the arm. In Fig. 30 of the drawings the several fingers 192 are set in a typical symmetrical pattern such as will restrict the action of the machine in order to gain a modification such as is illustrated in Fig. 31.

Each arm 193 is horizontally disposed and is preferably adjustable or extensible as shown in Fig. 27. By providing extensible or adjustable arms 193 the pairs of fingers can be adjusted toward and away from each other as desired. The standards 194 that carry the arms 193 are vertically adjustable on the standards and may be set thereon by suitable set screws 198. In practice, several stop means 190 may be employed or grouped on one standard 194, where they may be superimposed one above the other to be positioned to operate individually or to cooperate with each other.

The operating connection 191 provided between the stop means and carrier slide may vary widely in form and construction. In the case illustrated it is, in effect, a projection provided on or carried by the carrier slide K in such manner as to cooperate with the stop means 190. The particular mechanism illustrated in the drawings involves a pivoted projection or lever 200 mounted on a bracket 201 by means of a pivot pin 202. The bracket 201 is fixed on the slide K and projects upwardly therefrom at the side of the working frame to a point above the frame where it carries the pivot pin 202. The lower arm of the lever is suitably connected with the carrier slide, for instance, it may be connected to the driven line 122, which in turn connects to the carrier slide. The upper arm of lever 200 is provided with or carries a follower 205 which cooperates with the stop fingers 192.

In the particular case illustrated the bracket 201 and the lever, except for the follower 205, are duplicated so that such parts occur at the two sides of the machine so that the lever is, in effect, a yoke-like element as shown in Fig. 28.

With the modifying means just described the pairs of fingers may be selectively set to engage the follower 205 at various points remote from the pivotal axis of pin 202 and the several stop fingers 192 can be adjusted as desired. As the machine operates the follower 205 may operate between the stop fingers without contacting them or without engagement therewith during which time or through which range of operation the means T does not in any way act upon or influence the action of the machine. When the follower 205 of the means T engages a stop finger and the machine is continued in operation in a direction that would cause further movement of the follower in the direction which resulted in the engagement with the finger, the modifying action results. The degree to which the action or movement of the carrier slide is modified will obviously depend upon the proportioning of the lever of the modifying means, that is, the effective length of the lower arm of the lever relative to the upper arm of the lever. In practice this factor is subject to simple adjustment by varying the positions of the arms 193 on the standards 194. It will be apparent from the drawings that the machine may operate throughout a substantial range while the follower 102 is maintained in engagement with one or more of the stop fingers, all with the result that the movement or action of the carrier slide is materially modified. In the form of the invention illustrated a simple screw-actuated clamp 210 is provided on the lower arm of the lever 200 to provide a releasable connection between the lever and the driven line 122. Through this connection the modifying means T may be engaged or released, as desired.

Having described only typical preferred forms and applications of my invention, I do not wish to be limited or restricted to the specific details herein set forth, but wish to reserve to myself any variations or modifications that may appear to those skilled in the art and fall within the scope of the following claims:

Having described my invention, I claim:

1. A mechanism of the character described including, a table carrying a templet and work, a vertically adjustable work carrying platform, a frame-like base pivoted to the table and having an opening with the platform passing upward through it, the base having a track spaced from the pivotal mounting of the base, an elongate frame pivoted to the base on a substantially vertical axis to swing over the table and being supported by the track of the base, two parallel relatively movable slides carried by the frame to operate longitudinally thereof, a stylus carried by one slide to operate on the templet, a tool carried by the other slide to act on the work, and a differential drive through which the last mentioned slide is operated by the first mentioned slide.

2. A mechanism of the character described including, a table carrying a templet and work, a flat base having one end pivoted to the table and having a track at the other end, an elongate frame having one end portion pivoted to the base on an axis perpendicular thereto, means supporting the other end portion of the frame on said track, two parallel relatively movable slides carried by the frame to operate longitudinally thereof, a stylus carried by one slide to operate on the templet, a tool carried by the other slide to act on the work, and a differential drive through which the last mentioned slide is operated by the first mentioned slide.

3. A mechanism of the character described including, a table carrying a templet and work, a frame-like base pivoted to the table on an axis parallel with the table and having a central opening therein, a stop positioning the frame relative to the table, a work carrying platform carried by the table for vertical adjustment relative thereto and projecting up through the said opening in the base, an elongate frame pivoted to the base on an axis perpendicular thereto, two parallel relatively movable slides carried by the frame to operate lengthwise thereof, one slide projecting from one end of the frame, a stylus carried by the projecting portion of said slide to engage the templet, a tool carried by the other slide between the stylus and the axis of the frame and engageable with the work, and a differential drive between the slides.

4. A mechanism of the character described including, a table carrying a templet, a frame-like base pivoted to the table on an axis parallel with the table and having an opening therein, a stop positioning the frame relative to the table, a work carrying platform carried by the table for vertical adjustment relative thereto and projecting up through the opening in the base, an elongate frame pivoted to the base on an axis perpendicular thereto and including a plurality of parallel rails forming vertically spaced tracks, two parallel relatively movable slides carried by the frame to operate lengthwise thereof, the slides having runners supported between the tracks of the frame, one slide projecting from one end of the frame, a stylus carried by the projecting portion of said slide to engage the templet, a tool carried by the other slide between the stylus and the axis of the frame and engageable with the work, and a differential drive between the slides including a differential pulley mounted on the frame, a drive line extending between the ends of the first mentioned slide and driving the pulley, and a driven line extending between the ends of the said other slide and driven by the pulley.

5. A mechanism of the character described including, a table carrying a templet and work, an elongate frame mounted to swing over the table, two parallel relatively movable slides carried by the frame to operate longitudinally thereof, a stylus carried by one slide to operate on the templet, a cutter carried by the other slide to act on the work, and a differential drive through which the last mentioned slide is operated by the first mentioned slide, the drive including, a differential pulley carried by the frame, a drive line with end portions connected to the end portions of the first mentioned slide and having an intermediate portion engaged with and driving the pulley, a driven line with end portions connected to the end portions of the other slide and having an intermediate portion engaged by the pulley, and gravity actuated means maintaining tension on the lines including a bell crank having an arm connected to the line and an arm carrying a weight.

6. A mechanism of the character described including, a table carrying a templet and work, an elongate frame mounted to swing over the table, two parallel relatively movable slides carried by the frame to operate longitudinally thereof, a stylus carried by one slide to operate on the templet, a tool carried by the other slide to act on the work, a differential drive through which the said other slide is operated from the first mentioned slide, and cam means acting to vary operation of the said other slide without restricting operation of the first mentioned slide.

7. A mechanism of the character described including, a table carrying a templet and work, an elongate frame, a pivotal mounting supporting the frame to swing over the table, two parallel relatively movable slides carried by the frame to operate longitudinally thereof, a stylus carried by one slide to operate on the templet, a tool carried by the other slide to act on the work, a differential drive between the slides, and cam means shifting the said pivotal mounting as the said other slide operates.

8. A mechanism of the character described including, a table carrying a templet and work, an elongate frame, a pivotal mounting supporting the frame to swing over the table, two parallel relatively movable slides carried by the frame to operate longitudinally thereof, a stylus carried by one slide to operate on the templet, a tool carried by the other slide to act on the work, a differential drive between the slides, and cam means shifting the said pivotal mounting in two angularly related directions as the said other slide operates.

9. A mechanism of the character described including, a table carrying a templet and work, an elongate frame, a pivotal mounting supporting the frame to swing over the table, two parallel relatively movable slides carried by the frame to operate longitudinally thereof, a stylus carried by one slide to operate on the templet, a differential drive between the slides, and cam means shifting the said pivotal mounting in two angularly related directions as the said other slide operates.

10. A mechanism of the character described including, a table carrying a templet and work, an elongate frame, a pivotal mounting supporting the frame to swing over the table, two parallel relatively movable slides carried by the frame to operate longitudinally thereof, a stylus carried by one slide to operate on the templet, a tool carried by the other slide to act on the work, a differential drive between the slides, and cam means shifting the said pivotal mounting in two directions at right angles to each other as the said other slide operates.

11. A mechanism of the character described including, a table carrying a templet and work, an elongate frame, a pivotal mounting supporting the frame to swing over the table, two parallel relatively movable slides carried by the frame to operate longitudinally thereof, a stylus carried by one slide to operate on the templet, a tool carried by the other slide to act on the work, a differential drive between the slides, and two independently operating cam means shifting the said pivotal mounting in two directions at right angles to each other as the said other slide operates.

12. A mechanism of the character described including, a table carrying a templet and work, an elongate frame, a pivotal mounting supporting the frame to swing over the table, two parallel relatively movable slides carried by the frame to operate longitudinally thereof, a stylus carried by one slide to operate on the templet, a tool carried by the other slide to act on the work, a differential drive between the slides, and cam means operated by sliding movement of said other slide acting between the mounting of the frame and the frame to shift the pivotal mounting.

13. A mechanism of the character described including, a table carrying a templet and work, an elongate frame, a pivotal mounting supporting the frame to swing over the table, two parallel relatively movable slides carried by the frame to operate longitudinally thereof, a stylus carried by one slide to operate on the templet, a tool carried by the other slide to act on the work, a differential drive between the slides, and cam means operated by swinging movement of the frame and acting between the mounting of the frame and the frame to shift the pivot mounting.

14. A mechanism of the character described including, a table carrying a templet and work, an elongate frame, a pivotal mounting supporting the frame to swing over the table, two parallel relatively movable slides carried by the frame to operate longitudinally thereof, a stylus carried by one slide to operate on the templet, a tool carried by the other slide to act on the work, a differential drive between the slides, and two independently operating cam means, one operated by sliding movement of the said other slide and acting to shift the pivotal mounting in one direction relative to the table and the other operated by swinging movement of the frame and acting to shift the pivotal mounting in another direction relative to the table.

15. A mechanism of the character described including, a table carrying a templet and work, an elongate frame, a pivotal mounting supporting the frame to swing over the table, two parallel relatively movable slides carried by the frame to operate longitudinally thereof, a stylus carried by one slide to operate on the templet, a tool carried by the other slide to act on the work, a differential drive between slides, and cam means shifting the pivotal mounting as the frame swings relative to the table including a cam mounted substantially stationary relative to the table, and a follower on the frame cooperatively engaging the cam.

16. A mechanism of the character described including, a table carrying a templet and work, an elongate frame, a pivotal mounting supporting the frame to swing over the table, two parallel relatively movable slides carried by the frame to operate longitudinally thereof, a stylus carried by one slide to operate on the templet, a tool carried by the other slide to act on the work, a differential drive between slides, and cam means shifting the pivotal mounting relative to the table as said other slide operates including, a cam carried by the frame to shift relative thereto, a follower substantially stationary relative to the table and cooperating with the cam, and means shifting the cam relative to the frame as the said other slide operates relative to the frame.

17. A mechanism of the character described including, a table carrying a templet and work, an elongate frame, a pivotal mounting supporting the frame to swing over the table, two parallel relatively movable slides carried by the frame to operate longitudinally thereof, a stylus carried by one slide to operate on the templet, a tool carried by the other slide to act on the work, a differential drive between the slides, and cam means shifting the pivotal mounting relative to the table as the frame swings relative to the table, and as said other slide operates including, a cam pivotally carried by the frame, a follower substantially stationary relative to the table and engaging the cam, and a part on the said other slide engaging the cam to swing it as the said other slide operates relative to the frame.

18. A mechanism of the character described including, a table carrying a templet and work, an elongate frame, a pivotal mounting supporting the frame to swing over the table, two parallel relatively movable slides carried by the frame to operate longitudinally thereof, a stylus carried by one slide to operate on the templet, a tool carried by the other slide to act on the work, a differential drive between the slides, and two like oppositely disposed cam mechanisms each including a cam carried by the frame to shift relative thereto, a follower substantially stationary relative to the table and cooperating with the cam, and means shifting the cam relative to the frame as the said other slide operates relative to the frame.

19. A mechanism of the character described including, a table carrying a templet and work, an elongate frame mounted to swing over the table, two parallel relatively movable slides carried by the frame to operate longitudinally thereof, a stylus carried by one slide to operate on the templet, a tool carried by the other slide to act on the work, a differential drive between the slides, and means modifying the operation of the slide carrying the cutter including, a pivoted lever having an arm coupled with the said other slide and an arm stopped by a part on the table.

20. A mechanism of the character described including, a table carrying a templet and work, an elongate frame mounted to swing over the table, two parallel relatively movable slides carried by the frame to operate longitudinally thereof, a stylus carried by one slide to operate on the templet, a tool carried by the other slide to act on the work, a differential drive between the slides, and means modifying the operation of the slide carrying the cutter including, a lever pivotally mounted on the said other slide and having an arm yieldingly coupled to the said other slide and an arm cooperating with a stop on the table.

21. A mechanism of the character described including, a table carrying a templet and work, an elongate frame mounted to swing over the table, two parallel relatively movable slides carried by the frame to operate longitudinally thereof, a stylus carried by one slide to operate on the templet, a tool carried by the other slide to act on the work, a differential drive between the slides including a differential pulley, a drive line operated by the first mentioned slide and driving the pulley, and a driven line driven by the pulley and yieldingly coupled to the said other slide, and means modifying operation of said other slide including, a lever pivoted on the said other slide, and a stop on the table, the lever having an arm coupled to the driven line and having an arm cooperating with the stop.

22. A mechanism of the character described including, a table carrying a templet and work, an elongate frame mounted to swing over the table, two parallel relatively movable slides carried by the frame to operate longitudinally thereof, a stylus carried by one slide to operate on the templet, a tool carried by the other slide to act on the work, a differential drive between the slides including a differential pulley, a drive line operated by the first mentioned slide and driving the pulley, and a driven line driven by the pulley and yieldingly coupled to the said other slide, and means modifying operation of said other slide including, a lever pivoted on the said other slide, and a stop on the table, the lever having an arm coupled to the driven line and having an arm cooperating with the stop, the stop including a plurality of parts adjustable relative to each other.

23. A mechanism of the character described including, a table carrying a templet and work, an elongate frame mounted to swing over the table, two parallel relatively movable slides carried by the frame to operate longitudinally thereof, a stylus carried by one slide to operate on the templet, a tool carried by the other slide to act on the work, a differential drive between the slides, and means modifying the operation of the slide carrying the cutter including, a lever pivotally mounted on the said other slide, and a stop on the table, the lever having an arm yieldingly coupled to the said other slide and an arm cooperating with the stop, the stop including a plurality of parts adjustable relative to each other.

24. A mechanism of the character described including, a table carrying a templet and work, an elongate frame, a pivotal mounting supporting the frame to swing over the table, two parallel relatively movable slides carried by the frame to operate longitudinally thereof, a stylus carried by one slide to operate on the templet, a tool carried by the other slide to act on the work, a differential drive between the slides, means shifting the said pivotal mounting as the said other slide operates, and means modifying operation of the said other slide including, a lever pivotally mounted on the said other slide and having an arm yieldingly coupled to the said other slide and an arm cooperating with a stop on the table.

25. A mechanism of the character described including, a table carrying a templet and work, an elongate frame mounted with a portion clear of and arranged to swing over the table, two parallel relatively movable slides of substantially the same width and arranged one above the other and carried by the said portion of the frame to operate longitudinally thereof, a stylus carried by one slide to operate on the templet, a cutter carried by the other slide to act on the work, and a differential drive through which the last mentioned slide is operated by the first mentioned slide, the frame having two pairs of vertically spaced rails forming spaced tracks and the slides having runners held between the tracks.

26. A mechanism of the character described including, a table carrying a templet and work, an elongate frame mounted with a portion spaced above and free to swing over the table, two parallel superimposed relatively movable slides of substantially the same width, anti-friction means mounting the slides on the frame to operate longitudinally thereof, an extension projecting from one slide, a stylus carried by said extension to operate on the templet, a tool carried by the other slide to act on the work, and a differential drive through which the last mentioned slide is operated by the first mentioned slide, the frame having two pairs of vertically spaced rails forming spaced tracks and the slides being located between the tracks, the anti-friction means including balls engaged between the slides and tracks.

27. A mechanism of the character described including, a table carrying a templet and work, an elongate frame mounted to swing over the table, two parallel superimposed relatively movable slides of substantially the same width and carried by the frame to operate longitudinally thereof, a stylus carried by one slide to operate on the templet, a tool carried by the other slide to act on the work, and a differential drive through which the last mentioned slide is operated by the first mentioned slide, the frame including a pair of rails forming a lower track in a predetermined horizontal plane and supporting the slides and an upper pair of rails forming an upper track shiftable vertically relative to the lower track and overlying and retaining the slides thereon, and means adjusting the upper track relative to the lower track.

28. A mechanism of the character described including, a table carrying a templet and work, an elongate frame mounted to swing over the table, two parallel relatively movable slides, anti-friction means mounting the slides on the frame to operate longitudinally thereof, a stylus carried by one slide to operate on the templet, a tool carried by the other slide to act on the work, and a differential drive through which the last mentioned slide is operated by the first mentioned slide, the frame having two pairs of rails forming spaced tracks and the slides being located between the tracks, the anti-friction means including balls engaged between the runners and tracks, the rails being formed of sections, and coupling joining the sections and dividing the balls into groups longitudinally of the frame.

ARTHUR W. SCRUGGS.

References Cited in the file of this patent

UNITED STATES PATENTS

| Number | Name | Date |
| --- | --- | --- |
| 1,256,748 | Van Post | Feb. 19, 1918 |
| 1,349,250 | Albee | Aug. 10, 1920 |
| 1,351,211 | Keller | Aug. 31, 1920 |
| 1,386,745 | Van Post | Aug. 9, 1921 |
| 1,617,312 | Braren | Feb. 8, 1927 |
| 1,684,887 | Ridgway | Sept. 18, 1928 |
| 1,784,093 | De Vlieg | Dec. 9, 1930 |
| 2,021,931 | Bockins | Nov. 26, 1935 |
| 2,156,269 | Waldorf et al. | May 2, 1939 |
| 2,481,658 | Gruettner | Sept. 13, 1949 |
| 2,481,936 | Lord | Sept. 13, 1949 |
| 2,497,013 | Raynes | Feb. 7, 1950 |

FOREIGN PATENTS

| Number | Country | Date |
| --- | --- | --- |
| 480,767 | France | June 24, 1916 |
| 689,720 | France | June 2, 1930 |
| 1,141 | Great Britain | of 1893 |
| 494,819 | Great Britain | Nov. 1, 1938 |